US012368653B2

(12) United States Patent
Kasi et al.

(10) Patent No.: US 12,368,653 B2
(45) Date of Patent: Jul. 22, 2025

(54) SMF DISCOVERABILITY MANAGEMENT BASED ON CONNECTIVITY TO PEER NETWORK FUNCTIONS

(71) Applicant: T-Mobile USA, Inc., Bellevue, WA (US)

(72) Inventors: Narayanan Govindan Kasi, Olathe, KS (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 528 days.

(21) Appl. No.: 17/805,903

(22) Filed: Jun. 8, 2022

(65) Prior Publication Data

US 2023/0403207 A1    Dec. 14, 2023

(51) Int. Cl.
H04L 41/342    (2022.01)

(52) U.S. Cl.
CPC .................. H04L 41/342 (2022.05)

(58) Field of Classification Search
CPC ... H04L 41/342; H04L 41/06; H04L 41/0836; H04L 41/0816; H04L 43/0811; H04L 43/10
See application file for complete search history.

(56) References Cited

U.S. PATENT DOCUMENTS

| 2020/0136911 A1 | 4/2020 | Assali et al. |
| 2020/0153707 A1 | 5/2020 | Lu et al. |
| 2021/0306211 A1* | 9/2021 | Landais .............. H04L 43/0817 |
| 2023/0021904 A1* | 1/2023 | He .......................... H04L 69/40 |

FOREIGN PATENT DOCUMENTS

| WO | WO2019162862 A1 | 8/2019 |
| WO | WO2020030275 A1 | 2/2020 |
| WO | WO2022066078 A1 | 3/2022 |

OTHER PUBLICATIONS

Antipolis, "3GPP Standard TS 23.527", version 16.2.0 Technical Specification Group Core Network and Terminals; 5G System; Restoration Procedures (release 16) Dec. 2019; 19 pages.
Antipolis, "3GPP Standard TS 29.510", Version 17.5, Technical Specification Group Core Network and Terminals, 5G System; Network Function Respository Services, Stage 3, Release 17, 2022, 298 pgs.
Extended European Search Report and Written Opinion mailed Oct. 5, 2023 for European patent application No. 23172054.1, 11 pages.

* cited by examiner

*Primary Examiner* — Kiet Tang
(74) *Attorney, Agent, or Firm* — Lee & Hayes, P.C.

(57) ABSTRACT

Systems, devices, and techniques described herein are directed to managing discoverability of Session Management Functions (SMFs) in mobile networks based on connectivity to peer network functions (NFs). In particular, the systems, devices, and techniques can be implemented in fifth generation (5G) mobile networks to provide capability for an SMF to monitor connectivity with one or more peer network NFs, determine the connectivity with the one or more peer NFs does not satisfy a threshold level of connectivity with the peer NFs, and determine to suspend assignment of new calls and connections to the SMF. The SMF may then transmit a message to a network resource function (NRF) associated with the SMF to modify at least one status of the SMF at the NRF to cause the suspension of the assignment of the new calls and connections to the SMF.

20 Claims, 5 Drawing Sheets

SMF DISCOVERABILITY MANAGEMENT BASED ON CONNECTIVITY TO PEER NETWORK FUNCTIONS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
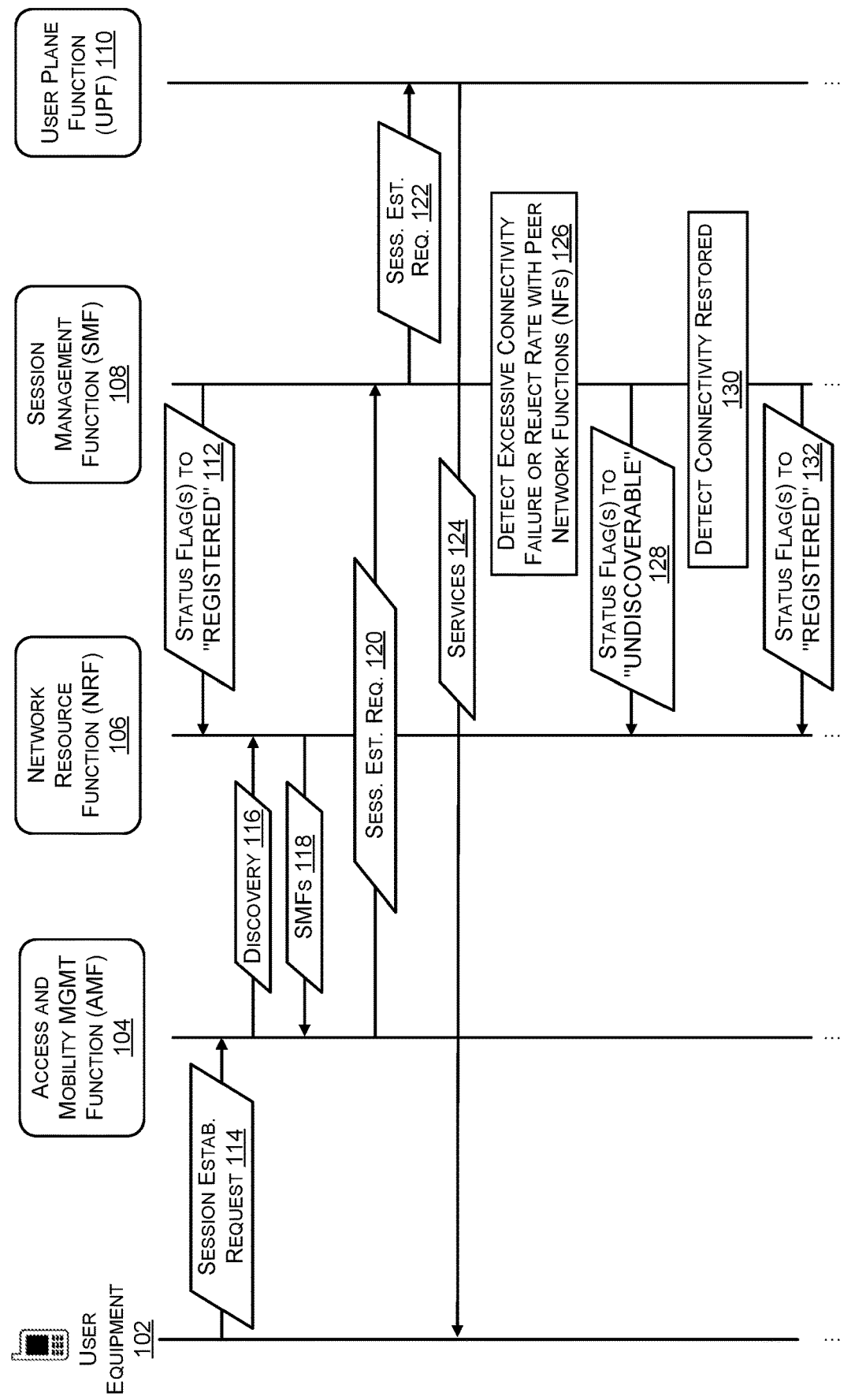
FIG. 1 is a diagram illustrating example signaling between a user equipment (UE) and various components of a mobile network, such as a fifth generation mobile network, as described herein.

The systems, devices, and techniques described herein are directed to managing discoverability of Session Management Functions (SMFs) in mobile networks based on connectivity to peer network functions (NFs).

For example, systems, devices, and techniques described herein can be implemented in fifth generation (5G) mobile networks to provide the capability for an SMF to suspend or allow the assignment of new calls or other connections to the SMF based on whether the SMF has lost connectivity to peer NFs and/or whether the SMF is experiencing other connectivity or functionality issues that may degrade user experience.

In an example, if an SMF determines the SMF is experiencing connectivity or other issues that may degrade user experience, the SMF may set the SMF's status flags (e.g., nfServiceStatus and nfStatus attributes) to "UNDISCOVERABLE" at the network resource function (NRF). Setting the SMF's status flags to "UNDISCOVERABLE" at the NRF may prevent new calls from being directed to the SMF, for example, using 5G Protocol Data Unit (PDU) session establishment procedures.

In some examples, after an SMF is initialized and registered with the NRF (e.g., which may include setting the SMF's status flags at the NRF to "REGISTERED"), the SMF may operate to monitor the SMF's connectivity and functionality. For example, the SMF may monitor the SMF's connectivity to peer NFs via heartbeat mechanisms. If the heartbeat mechanisms indicate a loss of connectivity to one or more peer NFs, the SMF may determine whether the number and/or types of peer NFs to which the SMF has lost connectivity meets or exceeds a threshold or satisfies another condition. If so, the SMF may perform operations to suspend the assignment of new calls or other connections to the SMF. Additionally or alternatively, the SMF may monitor the number of reject messages (e.g., PDU Session Establishment Reject messages) sent and/or received during a period of time (e.g., the last minute, five (5) minutes, fifteen (15) minutes, one hour, etc.). If the number of reject messages sent and/or received in the period of time meets or exceeds a threshold or satisfies another condition, the SMF may perform operations to suspend the assignment of new calls or other connections to the SMF. Examples are not limited to heartbeat mechanisms and/or the number of reject messages, as these are merely examples. Other examples may utilize additional or different metrics for determining the SMF has lost connectivity or is experiencing other operational problems that may degrade user experience to determine whether to perform operations to suspend the assignment of new calls or other connections to the SMF. As discussed above, if the SMF determines the SMF is experiencing connectivity problems or other issues that may degrade user experience, the SMF may suspend the assignment of new calls or other connections to the SMF by setting the SMF's status flags (e.g., nfServiceStatus and nfStatus attributes) to "UNDISCOVERABLE" at the NRF.

After suspending the assignment of new calls or other connections to the SMF, the SMF may determine if the connectivity problems have been resolved. The determination of whether the connectivity problems have been resolved may vary depending on the implementation and/or the basis for suspension. For example, after suspending the assignment of new calls or other connections to the SMF due to a loss of connectivity to peer NFs, the SMF may continue to monitor its connectivity to peer NFs (e.g., using the heartbeat mechanism) to detect additional peer NFs with which connectivity has been lost and to detect peer NFs with which connectivity has been restored. The SMF may determine whether the number and/or type of peer NFs with which the SMF is currently experiencing connectivity problems satisfies a condition to allow the assignment of new calls or other connections to the SMF. Depending on the example, the condition to allow the assignment of new calls or other connections to the SMF may be the same as or different from the condition for suspending the assignment of new calls or other connections to the SMF. For example, the condition for returning to allowing assignment of new calls or other connections to the SMF may be more strict than the condition for suspension (e.g., allow for fewer current lost connections to peer NFs). In another example, after suspending the assignment of new calls or other connections to the SMF due to the number of reject messages sent and/or received in the period of time satisfying a suspension condition, the SMF may be unable to utilize reject messages as a metric to determine the problem(s) have been resolved. More particularly, because new calls or other connections are no longer being assigned to the SMF, the SMF may attempt fewer or no additional session establishment procedures that would result in the occurrence of reject messages. In such a case, the condition for allowing the assignment of new calls or other connections to the SMF may be based on other metrics or may be based on input from a user indicating the problem has been resolved (e.g., maintenance has been performed to identify and correct the issue believed to be the cause of the connectivity problems). In another example, a SMF which has suspended the assignment of new calls or other connections to the SMF based on reject messages may operate to perform dummy or artificial session establishment procedures with peer NFs to determine when the number of reject messages being sent or received falls to an acceptable level. More particularly, the SMF may determine the number of session establishment procedures being performed in the time period that resulted in the suspension and perform a percentage of that number of dummy or artificial session establishment procedures after the suspension (e.g., 1%, 5%, 10%, 50%, etc.) and determine whether the number of resulting reject messages drops below the same percentage of the threshold used in the suspension.

If the SMF determines that the connectivity problems or other issues have been resolved, the SMF may operate to allow the assignment of new calls or other connections to the SMF. For example, the SMF may allow the assignment of new calls or other connections to the SMF by setting the SMF's status flags (e.g., nfServiceStatus and nfStatus attributes) to "REGISTERED" at the NRF.

The various functions and components discussed herein can be implemented either as a network element on a dedicated hardware, as a software instance running on a dedicated hardware, or as a virtualized function instantiated on an appropriate platform, such as a cloud infrastructure.

The systems, devices, and techniques described herein can improve the function of a network by preventing new calls from being assigned to SMFs that have lost connectivity to peer NFs. In some systems, an SMF may continue to be assigned new calls even when the SMF has lost communications to peer NFs such as the User Plane Function (UPF), the Unified Data Management (UDM), the Policy Control Function (PCF), and so on. As a result, subscriber's attach procedure may fail which may lead to an increase in retries and signaling messages. Further, some UPFs may experience an overloaded state when issues are present between the SMF and other UPFs in the same redundancy group (e.g., issues over the N4 and/or SX interfaces). The systems, devices, and techniques described herein may reduce or prevent these problems. These and other improvements to the functioning of a computer and network are discussed herein.

The systems, devices, and techniques described herein can be implemented in a number of ways. Example implementations are provided below with reference to the following figures.

FIG. 1 is a diagram illustrating example signaling 100 between a user equipment (UE) and various components of a mobile network, such as a fifth generation (5G) mobile network, as described herein. As illustrated, the signaling 100 includes interactions between a UE 102, an access and mobility management function (AMF) 104, a network resource function (NRF) 106, a session management function (SMF) 108, and a user plane function (UPF) 110. As can be understood in the context of this disclosure, the example signaling 100 is not limited to the components described in FIG. 1, and can include other components and operations.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

In general, the AMF 104 can be implemented as a network function including functionality to provide UE-based authentication, authorization, mobility management, etc., to various UEs. In some instances, the AMF 104 can include functionality to terminate a radio access network (RAN) control plane interface between the UE 102 and other functions on the network. In some instances, the AMF 104 can include functionality to perform registration management of the UE 102 in a network, connection management, reachability management, mobility management, access authentication, access authorization, security anchor functionality (e.g., receiving and/or transmitting security keys during registration/authorization), and the like. More particularly, in connection management, the AMF may determine which SMF is suited to handle the connection request by querying the Network Repository Function (NRF).

In general, the NRF 106 can be implemented as a network function including functionality to support service discovery (e.g., receive a network function discovery request and provide information associated with the discovered network function instances to a requesting entity). In some instances, the NRF 106 can select, assign, implement, or otherwise determine NFs to be used in a network based at least in part on status information, as discussed herein.

In general, the SMF 108 can be implemented as a network function including functionality to manage communication sessions by and between UEs, and/or to provide internet protocol (IP) addresses to the UEs. The SMF 108 may be responsible for interacting with the decoupled data plane, creating updating and removing Protocol Data Unit (PDU) sessions and managing session context with the UPF. In some instances, the SMF 108 can select a UPF of a plurality of UPFs as illustrated or a peer NF of a plurality of peer NFs, or the SMF 108 can utilize a UPF or peer NF provided by the NRF 106. The SMF 108 may also operate to suspend or allow the assignment of new calls or other connections to the SMF 108 based on whether the SMF has lost connectivity to peer NFs and/or whether the SMF is experiencing other connectivity or functionality issues that may degrade user experience, as discussed herein. For example, the SMF may suspend or allow the assignment of new calls or other connections to the SMF by setting the SMF's status flags at the NRF to "UNDISCOVERABLE" or "REGISTERED," respectively. As can be understood in the context of this disclosure, there may be a plurality of SMFs associated with a network and/or with the UE 102.

In general, the UPF 110 can be implemented as a network function including functionality to control data transfer between the UE 102 and the various components of the network. In some instances, the UPF 110 can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be a plurality of UPFs associated with a network and/or with the UE 102.

Turning to the signaling 100, the SMF 108 can transmit a message 112 to the NRF 106 to register the SMF 108 at the NRF 106 such that it is discoverable and new calls or other connections may be assigned to the SMF 108. Message 112 may set the SMF's status flags (e.g., nfServiceStatus and nfStatus attributes) at the NRF to "REGISTERED."

At a same or different time as the message 112, the UE 102 can transmit a session establishment request 114 (e.g., a PDU Session Establishment request) to the AMF 104. For example, the UE 102 can transmit the session establishment request 114 after the UE 102 has registered with the network (e.g., via an NR attach procedure). In some instances, the session establishment request 114 can include a request to initiate a voice communication, a video communication, a data communication, and the like, by and between the UE 102 and other services or devices in the network. As discussed in connection with FIG. 2, the AMF 104, the NRF 106, the SMF 108, and the UPF 110 can collectively be referred to as a network. In some examples, a PDU Session may provide connectivity between applications on UE 102 and an end point, such as a data network (e.g., the 'Internet' or private corporate networks).

Upon receiving the session establishment request 114, the AMF 104 may transmit a discovery message 116 to the NRF 106 to query the NRF 106 for information about SMFs that are registered with the NRF 106 and eligible to be assigned new calls or other connections. The NRF 106 may receive the discovery message 116 and return a message 118 containing a list of SMFs to the AMF 104. The list of SMFs may include SMFs that are registered with the NRF 106 and eligible to be assigned new calls or other connections (e.g., SMFs with status flags at the NRF set to "REGISTERED"), The AMF 104 may receive the message 118 containing the list of SMFs and determine an SMF 108 to assign the session establishment request. In some examples, the AMF 104 may also utilize additional information (e.g., congestion, utilization, etc.) in determining the SMF 108 to assign the session establishment request.

Next, the AMF 104 can transmit a session establishment request 120 to the SMF 108. At least partially in response to receiving the session request 120, the SMF 108 can select a UPF (e.g., UPF 110) and can transmit a session establishment request 122 to the selected UPF 110 which may indicate that UPF 110 has been selected and/or designated to provide communications to the UE 102. The selection of the UPF 110 may be at least partially based on information about available UPFs cached at the SMF 108 or information about available UPFs requested and received from the NRF 106. As can be understood in the context of this disclosure, the UPF information received from the NRF 106 can include an identifier of a single UPF (e.g., the UPF 110) to be utilized in a communication, or in some instances, the UPF information can include a plurality of UPFs that are available/capable to accommodate the session request 114. In some instances, the UPF information can include utilization level(s), capability information, locality information, etc. associated with one or more UPFs.

At least partially in response to the session establishment request 122, the UPF 110 can provide services 124 to the UE 102. As discussed herein, the UPF 110 can facilitate data transfer to and/or from the UE 102 to facilitate communications such as voice communications, video communications, data communications, etc.

Subsequent to message 112, the SMF 108 may operate to monitor the SMF's connectivity and functionality to detect excessive connectivity failure or reject rates with peer NFs (e.g., shown at 126). For example, the SMF 108 may monitor the SMF's connectivity to peer NFs via heartbeat mechanisms. If the heartbeat mechanisms indicate a loss of connectivity between the SMF 108 and one or more peer NFs, the SMF 108 may determine whether the number and/or types of peer NFs to which the SMF has lost connectivity meets or exceeds a threshold or satisfies another condition. For example, the SMF 108 may utilize a weighted determination based on the numbers of different types of peer NFs to which it has lost connectivity, which may also consider the total numbers of the different types of devices, to determine when the connectivity losses of the SMF are likely to cause user experience degradation. If the number and/or types of peer NFs to which the SMF 108 has lost connectivity meets or exceeds a threshold or satisfies another condition, the SMF 108 may perform operations to suspend the assignment of new calls or other connections to the SMF. Additionally or alternatively, the SMF 108 may monitor the number of reject messages (e.g., PDU Session Establishment Reject messages) sent and/or received during a period of time (e.g., the last minute, five (5) minutes, fifteen (15) minutes, one hour, etc.). If the number of reject messages sent and/or received in the period of time meets or exceeds a threshold or satisfies another condition, the SMF 108 may perform operations to suspend the assignment of new calls or other connections to the SMF 108.

As discussed above, if the SMF 108 determines the SMF 108 is experiencing connectivity problems or other issues that may degrade user experience (e.g., as detected at 126), the SMF 108 may suspend the assignment of new calls or other connections to the SMF 108 by transmitting a message 128 to the NRF to set the SMF's status flags (e.g., nfServiceStatus and nfStatus attributes) at the NRF to "UNDISCOVERABLE". For example, the SMF 108 may modify the SMF's nfServiceStatus and nfStatus attributes at the NRF via a NFUpdate message.

Examples are not limited to considering heartbeat mechanisms and/or the number of reject messages as the bases for suspending the assignment of new calls or other connections to the SMF 108, as these are merely examples. Other examples may utilize additional or different metrics for determining the SMF 108 has lost connectivity or is experiencing other operational problems that may degrade user experience to determine whether to perform operations to suspend the assignment of new calls or other connections to the SMF.

After suspending the assignment of new calls or other connections to the SMF, the SMF may determine if the connectivity or other problems have been resolved (e.g., shown at 130). The determination of whether the connectivity problems have been resolved may vary depending on the implementation and/or the basis for suspension. For example, after suspending the assignment of new calls or other connections to the SMF 108 due to a loss of connectivity to peer NFs, the SMF 108 may continue to monitor its connectivity to peer NFs (e.g., using the heartbeat mechanism) to detect additional peer NFs with which connectivity has been lost and to detect peer NFs with which connectivity has been restored. The SMF 108 may determine whether the number and/or type of peer NFs with which the SMF 108 is currently experiencing connectivity problems satisfies a condition to allow the assignment of new calls or other connections to the SMF 108. Depending on the example, the condition to allow the assignment of new calls or other connections to the SMF 108 may be the same as or different from the condition for suspending the assignment of new calls or other connections to the SMF 108. For example, the condition for returning to allowing assignment of new calls or other connections to the SMF may be more strict than the condition for suspension (e.g., the condition for returning to allowing assignment of new calls or connections may require the SMF have fewer current lost connections to peer NFs than the SMF had to experience to suspend the assignment of calls to the SMF). In another example, after suspending the assignment of new calls or other connections to the SMF due to the number of reject messages sent and/or received in the period of time satisfying a suspension condition, the SMF may be unable to utilize reject messages as a metric to determine the problem(s) have been resolved. More particularly, because new calls or other connections are no longer being assigned to the SMF, the SMF may attempt fewer or no additional session establishment procedures that would result in the occurrence of reject messages. In such a case, the condition for allowing the assignment of new calls or other connections to the SMF may be based on other metrics or may be based on input from a user indicating the problem has been resolved (e.g., maintenance has been performed to identify and correct the issue believed to be the cause of the connectivity problems). In another example, a SMF which has suspended the assignment of new calls or other connections to the SMF based on reject messages may operate to perform dummy or artificial session establishment procedures with peer NFs to determine when the number of reject messages being sent or received falls to an acceptable level. More particularly, the SMF may determine the number of session establishment procedures being performed in the time period that resulted in the suspension and perform a percentage of that number of dummy or artificial session establishment procedures after the suspension (e.g., 1%, 5%, 10%, 50%, etc.) and determine whether the number of resulting reject messages drops below the same percentage of the threshold used in the suspension.

If the SMF 108 determines that the connectivity problems or other issues have been resolved (e.g., at 130), the SMF may operate to allow the assignment of new calls or other connections to the SMF by transmitting a message 132 to the NRF to set the SMF's status flags (e.g., nfServiceStatus and nfStatus attributes) at the NRF to "REGISTERED". For example, the SMF 108 may modify the SMF's nfServiceStatus and nfStatus attributes at the NRF via a NFUpdate message.

In accordance with various embodiments described herein, the terms "user equipment (UE)," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, a user can further utilize the UE 102 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the 3$^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be include in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The UE 102 is configured to utilize various radio access networks (RANs) in order to access the IMS core. In general, the IMS core is agnostic to the access technology that is used to connect a UE to the IMS core. In this manner, the UE 102 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 102 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage. Additional details of an example network and aspects of the function selection are discussed below in connection with FIG. 2.

Figure 2:
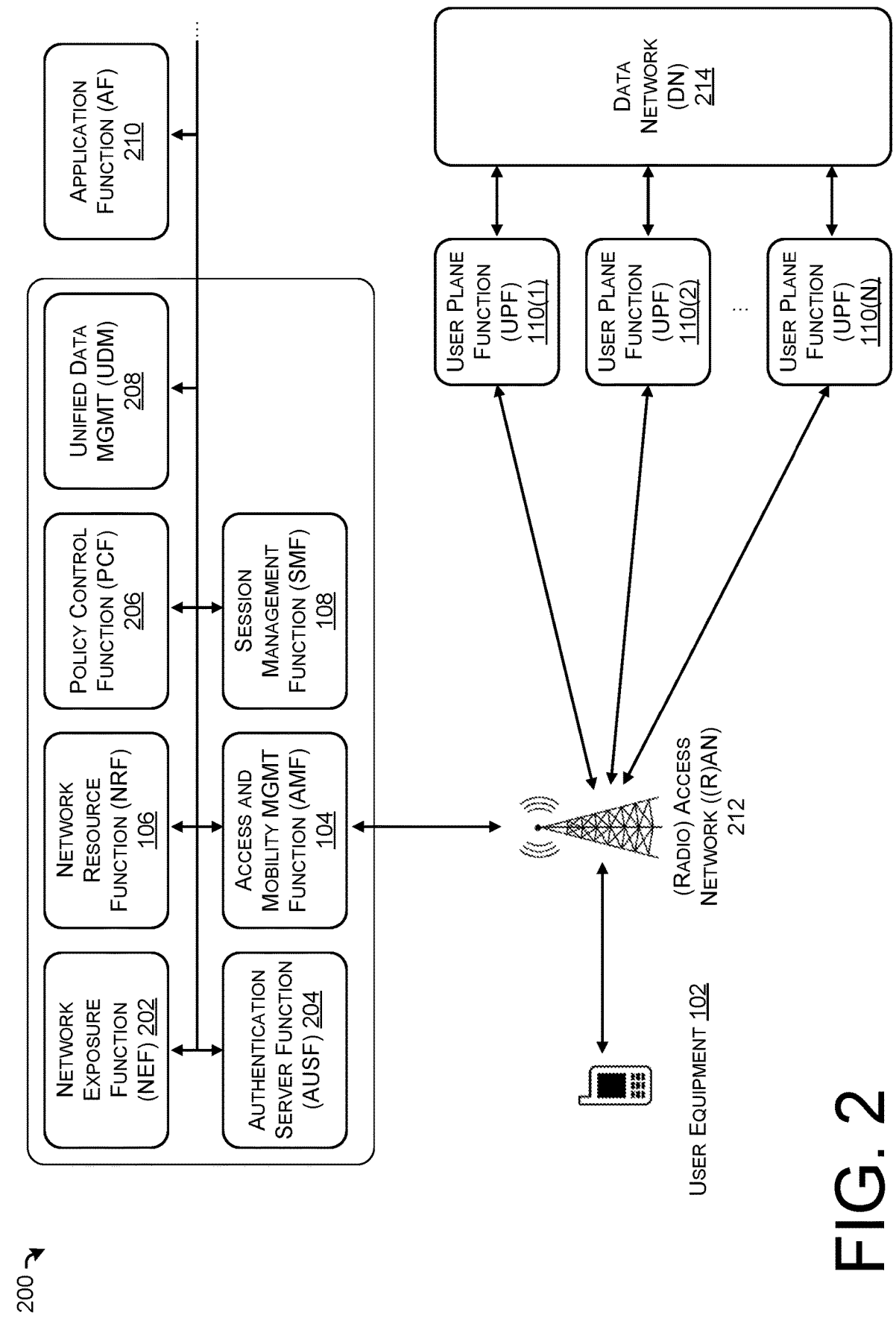
FIG. 2 illustrates an example environment including UE and various components implementing the functionality to manage discoverability of Session Management Functions (SMFs) in mobile networks based on connectivity to peer network functions (NFs), as described herein.

FIG. 2 illustrates an example environment 200 including user equipment (UE) and various components implementing the functionality to manage discoverability of Session Management Functions (SMFs) in mobile networks based on connectivity to peer network functions (NFs), as described herein. For example, the environment 200 includes the UE 102, the access and mobility function (AMF) 104, the network resource function (NRF) 106, the SMF 108, and user plane functions (UPFs) 110(1), 110(2), . . . , 110(N) (where N is an integer), as discussed in connection with FIG. 1, as well as a network exposure function (NEF) 202, an authentication server function (AUSF) 204, a policy control function (PCF) 206, a unified data management (UDM) 208, an application (AF) 210, a (radio) access network ((R)AN) 212, and a data network (DN) 214.

In general, the NEF 202 can be implemented as a network function including functionality to securely expose services and/or capabilities provided by and amongst the various network functions, as discussed herein. In some instances, the NEF 202 receives information from other NFs and can store the received information as structured data using an interface to a data storage network function.

In general, the AUSF 204 can be implemented as a network function including functionality to provide authentication to various devices in the network. For example, the AUSF 204 can request device credentials (e.g., security key(s)), verify that a device is authorized to connect to a network, and/or control access to the network based on the device credentials.

In general, the PCF 206 can be implemented as a network function including functionality to support unified policy framework to govern network behavior, provide policy rules to control plane functions and/or enforce such rules, and/or implement a front end to access subscription information relevant for policy decisions in a data repository.

In general, the UDM 208 can be implemented as a network function including functionality to process authentication credentials, handle user identification processing, manage registration and/or mobility, manage subscriptions between a UE and a carrier, and or manage SMS (short message service) data.

In general, the AF 210 can be implemented as a network function including functionality to route traffic to/from applications operating on the network, facilitate accessing the network exposure function (NEF) 202, and interact with the policy framework for policy control in connection with the PCF 206.

In general, the (R)AN 212 can be implemented as a variety of technologies to provide wired and/or wireless access to the network, as discussed herein. In some instances, the (R)AN 212 (also referred to as a RAN 212) can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the RAN 212 can include any number and type of base stations representing any number and type of macrocells, microcells, picocells, or femtocells, for example, with any type or amount of overlapping coverage or mutually exclusive coverage.

In general, the DN 214 can include any public or private network(s), such as the internet.

In general, the NRF 106 can receive information associated with any of the various NFs herein to select, assign, implement, or otherwise determine which network function of a plurality of NFs to use based at least in part on the information.

In general, the devices and NFs illustrated in the environment 200 can be communicatively coupled via one or more control planes which can pass controls and signaling by and between the various components discussed herein. Further, the environment 200 can include a plurality of each of the various functions (e.g., the SMF 108 can represent a plurality of SMFs, for example). The environment 200 can further include additional functions and is not limited to those represented in FIG. 2.

Figure 3:
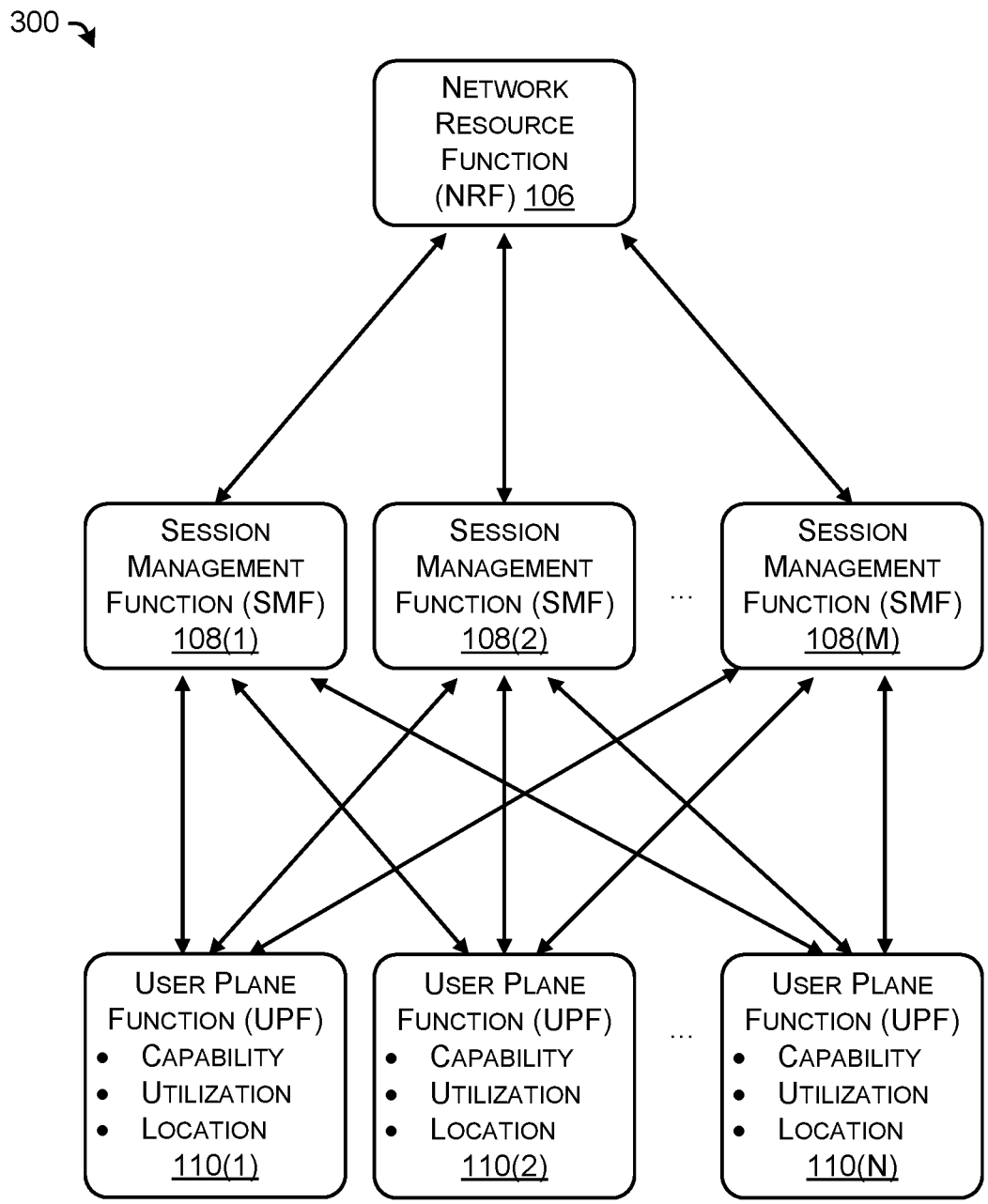
FIG. 3 illustrates an example topology of a network resource function (NRF) providing functionality to a plurality of SMFs and user plane functions (UPFs), as discussed herein.

FIG. 3 illustrates an example topology 300 of a network resource function (NRF) providing functionality to a plurality of session management functions (SMFs) and user plane functions (UPFs), as discussed herein. The example topology 300 illustrates how the various NFs can be distributed between hardware components, software components, and/or virtualized functions, which can introduce the challenges of managing requests for NFs within a network, particularly when new calls or connection requests may continue to be assigned to an SMF which has lost connectivity with peer NFs.

As illustrated, the NRF 106 can interact with a plurality of SMFs 108(1), 108(2), . . . , 108(M) (where M is an integer that may be a same or different number than N) (also collectively referred to as SMFs 108). In turn, the SMFs 108(1), 108(2), . . . , 108(M) can be communicatively coupled with a plurality of UPFs 110(1), 110(2), . . . , 110(N) (collectively referred to as UPFs 110). As discussed herein, the SMFs 108 and UPFs 110 can be registered with and provide information to the NRF 106 so that the NRF 106 can provide SMF information or UPF information to AMFs or SMFs to allow the establishment of sessions for UEs, as discussed above.

Further, the example topology 300 provides a flexible framework which allows various functions to be added and removed from the network during operation so that workload can be distributed in a seamless manner. For example, if a UPF 110 is scheduled for maintenance or an SMF 108 is experiencing connectivity or functionality problems, the NRF 106 can easily stop the SMFs 108 or AMFs 104 from using the UPF 110 or SMF 108, or can provide other UPFs or SMFs to the SMFs 108 or AMFs to facilitate communications. For example, when experiencing connectivity issues, the SMF 108(1) may set its status flags at the NRF 106 to "UNDISCOVERABLE", resulting in new calls or connections being directed to the other SMFs. After connectivity problems at an SMF 108 are resolved, for example, the SMF 108(1) may set its status flags at the NRF 106 to "REGISTERED", resulting in new calls or connections being assigned to SMF 108(1).

Figure 4:
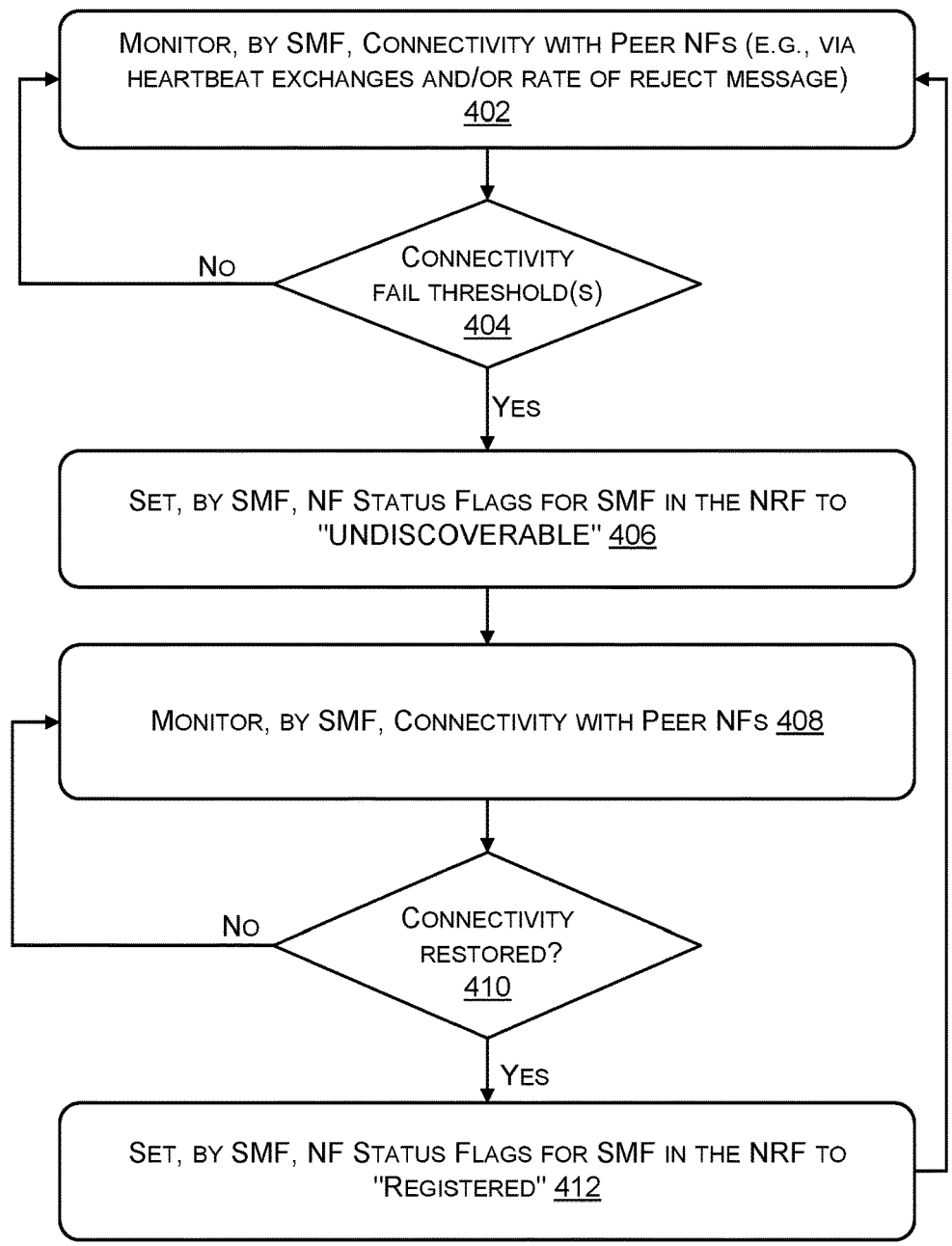
FIG. 4 illustrates an example process for managing discoverability of SMFs in mobile networks based on connectivity to peer NFs.

FIG. 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for managing discoverability of Session Management Functions (SMFs) in mobile networks based on connectivity to peer network functions (NFs). More particularly, the process 400 may provide functionality for an SMF to suspend or allow the assignment of new calls or other connections to the SMF based on whether the SMF has lost connectivity to peer NFs and/or whether the SMF is experiencing other connectivity or functionality issues that may degrade user experience. The example process 400 can be performed by the SMF 108 (or another component), in connection with other components discussed herein. Some or all of the process 400 can be performed by one or more devices or components in the environment 200, for example.

At operation 402, the process can include monitoring, by the SMF 108, connectivity with peer NFs. For example, the SMF 108 may monitor connectivity based on heartbeat exchanges with peer NFs and/or based on a rate of reject message occurring in the operation of the SMF 108.

At operation 404, the process can include determining whether the connectivity with the peer NFs failed one or more thresholds or conditions for suspending the assignment of new calls or connections to the SMF. If so, the process may continue to 406. Otherwise, the process may return to 402.

At operation 406, the process can include setting, by the SMF 108, status flags for the SMF 108 in an NRF to suspend the assignment of new calls or connections to the SMF 108. For example, the SMF 108 may set the NF status flags for the SMF 108 in an NRF to "UNDISCOVERABLE".

At operation 408, the process can include monitoring, by the SMF 108, connectivity with peer NFs. Operation 408 may utilize the same or different monitoring criteria as operation 402 as discussed above with respect to item 130 of FIG. 1.

At operation 410, the process can include determining whether the connectivity has been restored sufficiently with the peer NFs to satisfy one or more thresholds or conditions for allowing the assignment of new calls or connections to the SMF 108. If so, the process may continue to 412. Otherwise, the process may return to 408.

At operation 412, the process can include setting, by the SMF 108, status flags for the SMF 108 in an NRF to allow the assignment of new calls or connections to the SMF 108. For example, the SMF 108 may set the NF status flags for the SMF 108 in an NRF to "REGISTERED".

Figure 5:
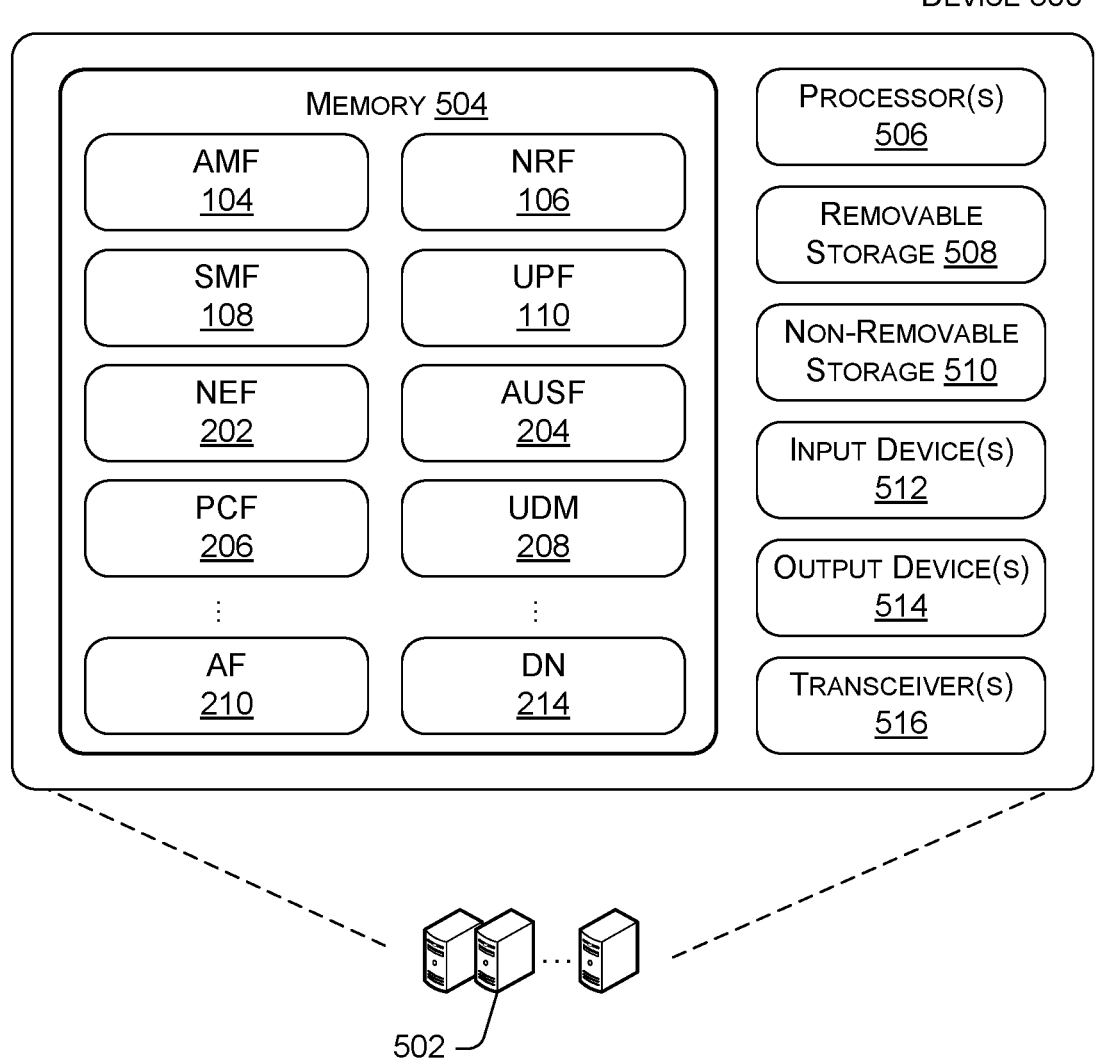
FIG. 5 illustrates an example device to implement functionality for managing discoverability of SMFs in mobile networks based on connectivity to peer NFs, as described herein.

FIG. 5 illustrates an example device 500 to implement functionality for managing discoverability of Session Management Functions (SMFs) in mobile networks based on connectivity to peer network functions (NFs), as described herein. In some embodiments, some or all of the functionality discussed in connection with FIGS. 1-4 can be implemented in the device 500. Further, the device 500 can be implemented as a server computer 502, a network element on a dedicated hardware, as a software instance running on a dedicated hardware, or as a virtualized function instantiated on an appropriate platform, such as a cloud infrastructure, and the like. It is to be understood in the context of this disclosure that the device 500 can be implemented as a single device or as a plurality of devices with components and data distributed among them.

As illustrated, the device 500 comprises a memory 504 storing the access and mobility management function (AMF) 104, the network resource function (NRF) 106, the SMF 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 to provide functionality to the device 500 to manage discoverability of SMFs in mobile networks based on connectivity to peer NFs, as described herein. Also, the device 500 includes processor(s) 506, a removable storage 508 and non-removable storage 510, input device(s) 512, output device(s) 514, and transceiver(s) 516.

Aspects of the access and mobility management function (AMF) 104, the NRF 106, the SMF 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 are discussed above with connection with at least FIGS. 1 and 2. In general, these functions comprise aspects of a 5G mobile network.

In various embodiments, the memory 504 is volatile (such as RAM), non-volatile (such as ROM, flash memory, etc.) or some combination of the two. The access and mobility management function (AMF) 104, the NRF 106, the SMF 108, the UPF 110, the network exposure function (NEF) 202, the authentication server function (AUSF) 204, the policy control function (PCF) 206, the unified data management (UDM) 208, the application function (AF) 210, and the data network (DN) 214 stored in the memory 504 can comprise methods, threads, processes, applications or any other sort of executable instructions. The access and mobility management function (AMF) 104, the NRF 106, the SMF 108, the UPF 110, the network exposure function (NEF) 202, the authentication server function (AUSF) 204, the policy control function (PCF) 206, the unified data management (UDM) 208, the application function (AF) 210, and the data network (DN) 214 can also include files and databases.

In some embodiments, the processor(s) 506 is a central processing unit (CPU), a graphics processing unit (GPU), or both CPU and GPU, or other processing unit or component known in the art.

The device 500 also includes additional data storage devices (removable and/or non-removable) such as, for example, magnetic disks, optical disks, or tape. Such additional storage is illustrated in FIG. 5 by removable storage 508 and non-removable storage 510. Tangible computer-readable media can include volatile and nonvolatile, removable and non-removable media implemented in any method or technology for storage of information, such as computer readable instructions, data structures, program modules, or other data. Memory 504, removable storage 508 and non-removable storage 510 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 500. Any such tangible computer-readable media can be part of the device 500.

The device 500 also can include input device(s) 512, such as a keypad, a cursor control, a touch-sensitive display, voice input device, etc., and output device(s) 514 such as a display, speakers, printers, etc. These devices are well known in the art and need not be discussed at length here.

As illustrated in FIG. 5, the device 500 also includes one or more wired or wireless transceiver(s) 516. For example, the transceiver(s) 516 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 516 can utilize multiple-input/multiple-output (MIMO) technology. The transceiver(s) 516 can comprise any sort of wireless transceivers capable of engaging in wireless, radio frequency (RF) communication. The transceiver(s) 516 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
monitoring, by a Session Management Function (SMF), connectivity with one or more peer network functions (NFs);
determining the connectivity with the one or more peer NFs does not satisfy a threshold level of connectivity with the one or more peer NFs;
determining, based on the determining the connectivity with the one or more peer NFs does not satisfy the threshold level of connectivity, to suspend assignment of new calls and connections to the SMF; and
transmitting, based at least in part on the determining to suspend assignment of the new calls and connections to the SMF, a message to a network resource function (NRF) associated with the SMF to modify at least one status of the SMF at the NRF to cause suspension of the assignment of the new calls and connections to the SMF.

2. The system of claim 1, wherein the monitoring, by the SMF, the connectivity with the one or more peer NFs is performed using one or more heartbeat functions.

3. The system of claim 1, wherein the message to the NRF associated with the SMF modifies an nfServiceStatus attribute and an nfStatus attribute of the SMF at the NRF to "UNDISCOVERABLE".

4. The system of claim 1, wherein the operations further comprise:
determining, after transmitting the message, that the connectivity satisfies the threshold level of connectivity or another threshold level of connectivity;
determining, based on the determining that the connectivity satisfies the threshold level of connectivity or another threshold level of connectivity, to allow assignment of new calls and connections to the SMF; and
transmitting, based at least in part on the determining to allow assignment of the new calls and connections to the SMF, another message to a NRF associated with the SMF to modify the at least one status of the SMF at the NRF to cause allowance of the assignment of the new calls and connections to the SMF.

5. A system comprising:
one or more processors;
a memory; and
one or more components stored in the memory and executable by the one or more processors to perform operations comprising:
monitoring, by a Session Management Function (SMF), connectivity with one or more peer network functions (NFs);
determining, based on the connectivity with the one or more peer NFs, to suspend assignment of new calls and connections to the SMF; and
transmitting, based at least in part on the determining to suspend assignment of the new calls and connections to the SMF, a message to a network resource function (NRF) associated with the SMF to modify at least one status of the SMF at the NRF to cause suspension of the assignment of the new calls and connections to the SMF.

6. The system of claim 5, wherein the monitoring, by the SMF, the connectivity with the one or more peer NFs is performed using one or more heartbeat functions.

7. The system of claim 5, wherein the monitoring, by the SMF, the connectivity with the one or more peer NFs is performed at least in part based on a rate of occurrence of reject messages associated with the SMF.

8. The system of claim 5, wherein the message to the NRF associated with the SMF modifies an nfServiceStatus attribute and an nfStatus attribute of the SMF at the NRF to "UNDISCOVERABLE".

9. The system of claim 5, wherein:
the determining, based on the connectivity with the one or more peer NFs, to suspend the assignment of the new calls and connections to the SMF is based at least in part on the monitoring determining that connectivity with at least one peer NF has been lost; and
the operations further comprise:
determining, after transmitting the message and based on the monitoring, that connectivity has been restored with at least one peer NF with which connectivity was lost;
determining, based on the determining that the connectivity has been restored with the at least one peer NF with which connectivity was lost, to allow assignment of new calls and connections to the SMF; and
transmitting, based at least in part on the determining to allow assignment of the new calls and connections to the SMF, another message to the NRF associated with the SMF to modify the at least one status of the SMF at the NRF to cause allowance of the assignment of the new calls and connections to the SMF.

10. The system of claim 9, wherein the other message to the NRF associated with the SMF modifies an nfServiceStatus attribute and an nfStatus attribute of the SMF at the NRF to "REGISTERED".

11. The system of claim 9, wherein the determining to suspend assignment of new calls and connections to the SMF is further based at least in part on a first threshold level of connectivity with the one or more peer NFs and the determining to allow assignment of new calls and connections to the SMF is further based on a second, different threshold level of connectivity.

12. The system of claim 5, wherein the operations further comprise:
  receiving, after transmitting the message, an indication that connectivity has been restored with at least one peer NF with which connectivity was lost; and
  transmitting, based at least in part on the receiving the indication, another message to the NRF associated with the SMF to modify the at least one status of the SMF at the NRF to cause allowance of the assignment of the new calls and connections to the SMF.

13. A processor-implemented method comprising:
  monitoring, by a Session Management Function (SMF), connectivity with one or more peer network functions (NFs);
  determining, based on the connectivity with the one or more peer NFs, to suspend assignment of new calls and connections to the SMF; and
  transmitting, based at least in part on the determining to suspend assignment of the new calls and connections to the SMF, a message to a network resource function (NRF) associated with the SMF to modify at least one status of the SMF at the NRF to cause suspension of the assignment of the new calls and connections to the SMF.

14. The processor-implemented method of claim 13, wherein the monitoring, by the SMF, the connectivity with the one or more peer NFs is performed using one or more heartbeat functions.

15. The processor-implemented method of claim 13, wherein the monitoring, by the SMF, the connectivity with the one or more peer NFs is performed at least in part based on a rate of occurrence of reject messages associated with the SMF.

16. The processor-implemented method of claim 13, wherein the message to the NRF associated with the SMF modifies an nfServiceStatus attribute and an nfStatus attribute of the SMF at the NRF to "UNDISCOVERABLE".

17. The processor-implemented method of claim 13, wherein:
  the determining, based on the connectivity with the one or more peer NFs, to suspend the assignment of the new calls and connections to the SMF is based at least in part on the monitoring determining that connectivity with at least one peer NF has been lost; and
  the method further comprises:
    determining, after transmitting the message and based on the monitoring, that connectivity has been restored with at least one peer NF with which connectivity was lost;
    determining, based on the determining that the connectivity has been restored with the at least one peer NF with which connectivity was lost, to allow assignment of new calls and connections to the SMF; and
    transmitting, based at least in part on the determining to allow assignment of the new calls and connections to the SMF, another message to the NRF associated with the SMF to modify the at least one status of the SMF at the NRF to cause allowance of the assignment of the new calls and connections to the SMF.

18. The processor-implemented method of claim 17, wherein the other message to the NRF associated with the SMF modifies an nfServiceStatus attribute and an nfStatus attribute of the SMF at the NRF to "REGISTERED".

19. The processor-implemented method of claim 17, wherein the determining to suspend assignment of new calls and connections to the SMF is further based at least in part on a first threshold level of connectivity with the one or more peer NFs and the determining to allow assignment of new calls and connections to the SMF is further based on a second, different threshold level of connectivity.

20. The processor-implemented method of claim 13, wherein the method further comprises:
  receiving, after transmitting the message, an indication that connectivity has been restored with at least one peer NF with which connectivity was lost; and
  transmitting, based at least in part on the receiving the indication, another message to the NRF associated with the SMF to modify the at least one status of the SMF at the NRF to cause allowance of the assignment of the new calls and connections to the SMF.

* * * * *